United States Patent [19]

Chester

[11] 4,105,040

[45] Aug. 8, 1978

[54] TEMPERATURE RESPONSIVE VALVE SEAL

[76] Inventor: Arnold M. Chester, 129 Montclair Dr., West Hartford, Conn. 06107

[21] Appl. No.: 810,302

[22] Filed: Jun. 27, 1977

[51] Int. Cl.² ............................................. F16K 5/06
[52] U.S. Cl. .................................. 137/72; 251/174; 251/306; 277/26
[58] Field of Search .................................. 137/72–77; 251/173, 174, 210, 306, 307; 277/26

[56] References Cited

U.S. PATENT DOCUMENTS

| | | | |
|---|---|---|---|
| 2,983,478 | 5/1961 | Masheder | 251/307 X |
| 3,346,234 | 10/1967 | Allen | 251/174 |
| 3,986,699 | 10/1976 | Wucik et al. | 251/173 |
| 3,990,465 | 11/1976 | Allen | 137/72 |

*Primary Examiner*—Martin P. Schwadron
*Assistant Examiner*—Richard Gerard
*Attorney, Agent, or Firm*—Richard H. Berneike

[57] ABSTRACT

A butterfly valve with a conventional resilient seal of rubber or plastic or the like is provided with a secondary seal of a hard, fire resistant material such as metal. The secondary seal is in the form of a split ring which is held in an expanded condition with a fusible link which will melt at some selected temperature such that the secondary seal is normally out of contact with the sealing surface of the butterfly. At the selected temperature, the fusible link melts permitting the secondary seal to contract into a sealing position to replace the resilient seal prior to or coincident with the destruction of the resilient seal by the high temperature.

10 Claims, 8 Drawing Figures

TEMPERATURE RESPONSIVE VALVE SEAL

BACKGROUND OF THE INVENTION

This invention relates to valves for controlling fluid flow and particularly to valves which are commonly referred to as butterfly or ball valves. Butterfly valves will be used throughout the description of the invention as well as the background but it is to be understood that the invention is equally applicable to ball valves.

Butterfly valves conventionally have a resilient seal between the valve body and the butterfly which effects a seal when the butterfly is in the closed position. There are many specific designs for such seals to ensure an effective seal. For example, there are designs which employ the pressure of the fluid to force the seal into intimate contact when the valve is closed. A common denomination in such valve seals is that they are formed from some resilient material, such as rubber or plastic material. Although these materials provide the necessary resiliency to effect a good seal, these same materials create another problem.

It is, in many situations, desirable or necessary that a valve maintain a seal under extremely high temperatures such as when there is a fire either inside the piping system itself or outside the piping system in the vicinity of the valve. When fire causes the valve temperature to rise to high levels, the resilient seal of the valve can deteriorate or be destroyed so that it will no longer be effective as a seal.

SUMMARY OF THE INVENTION

An object of the present invention is to provide valve sealing means which is normally in an inoperative position but which will become operative when a selected high temperature is reached. More particularly, a metal or other heat resistant seal is held in an inoperative position by a fusible material which will melt at a selected temperature permitting the seal to move to an operative-sealing position. The specifics of the invention and the objects and advantages thereof will be apparent from the following description.

DESCRIPTION OF THE PREFERRED EMBODIMENTS

Figure 1:
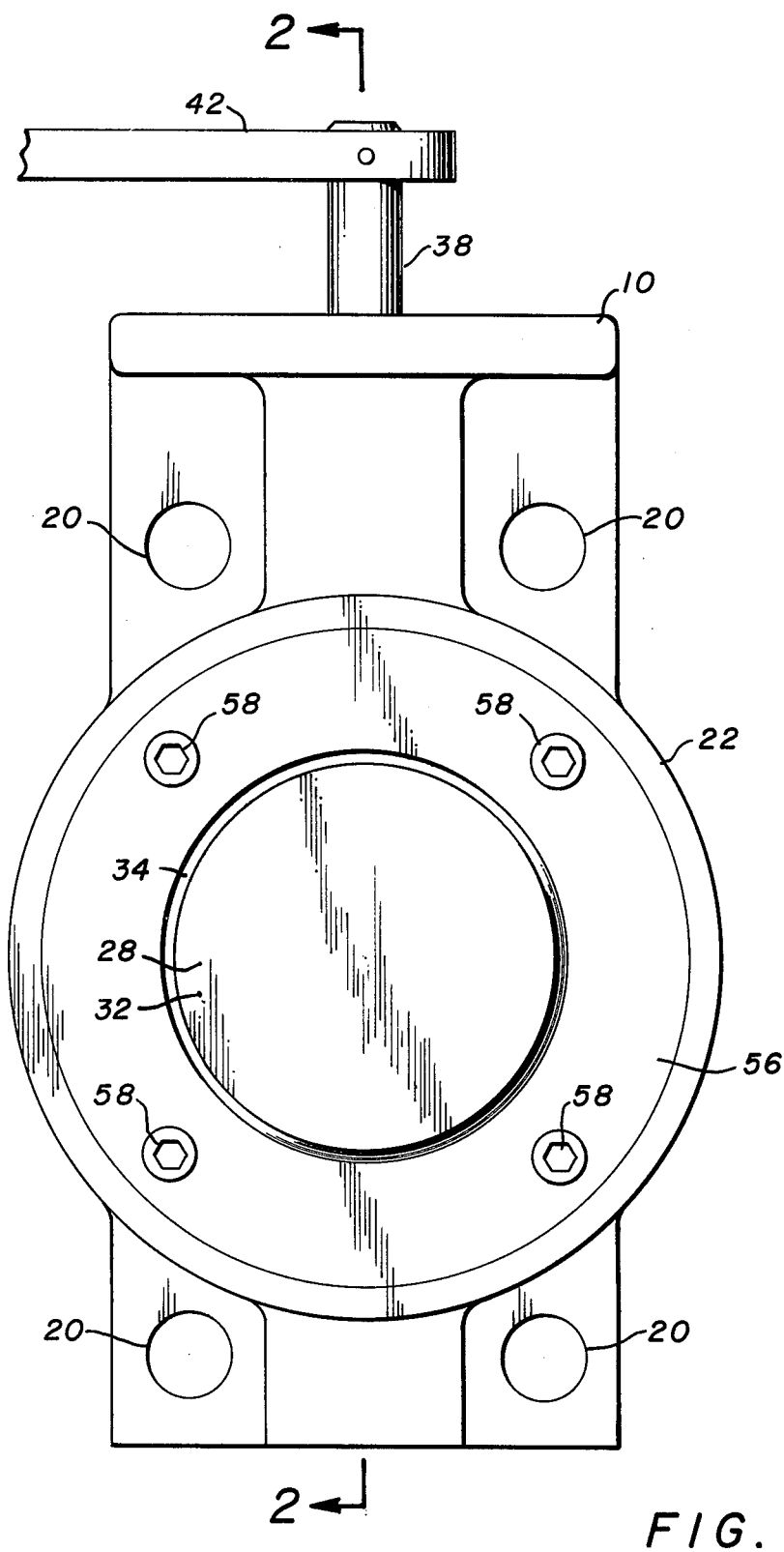
FIG. 1 is an elevation view of the face of a butterfly valve of the present invention.
Figure 2:
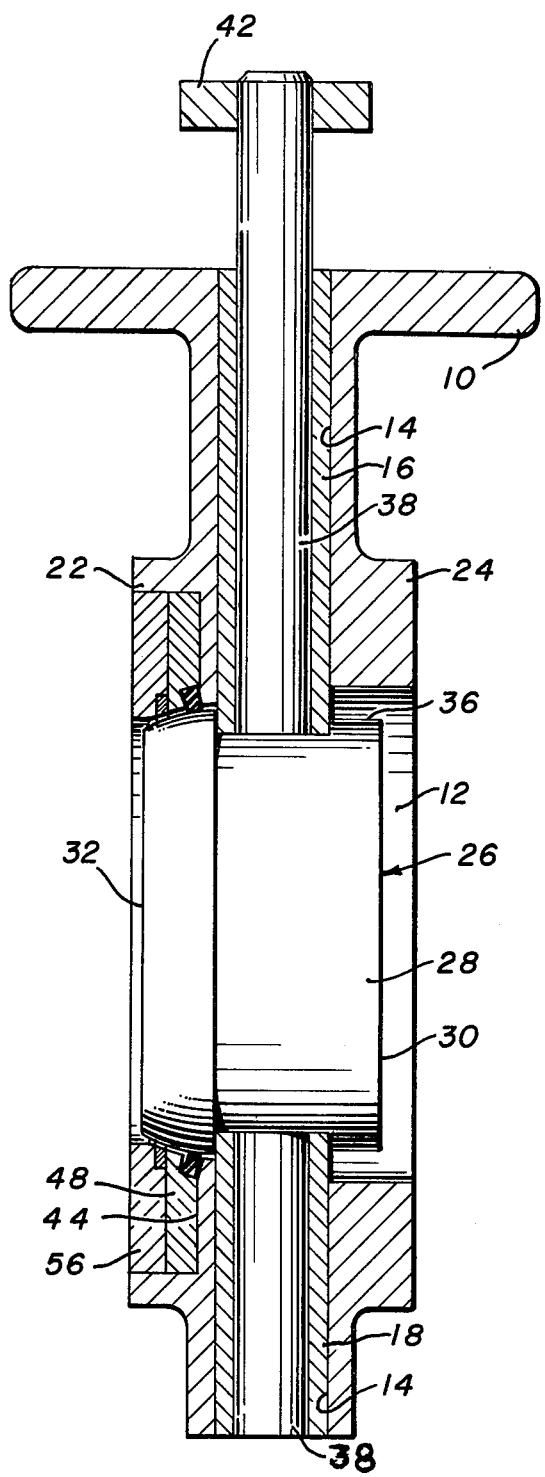
FIG. 2 is a cross-section view taken along section line 2—2 of FIG. 1.

Referring first to FIGS. 1 and 2, the valve of the present invention is illustrated including a valve body or housing 10 having a generally cylindrical flow passage 12. Disposed at right angles to the flow passage 12 is a generally cylindrical bore 14 which extends completely through the housing. The bore 14 has a bushing 16 located therein on one side of the cylindrical flow passage 12 and a bushing 18 located therein on the other side of the cylindrical flow passage 12. Four holes 20 are provided in the housing 10 to accommodate bolts in a customary manner to secure the valve to pipes flanges which mate with the housing flanges 22 and 24.

Figure 3:
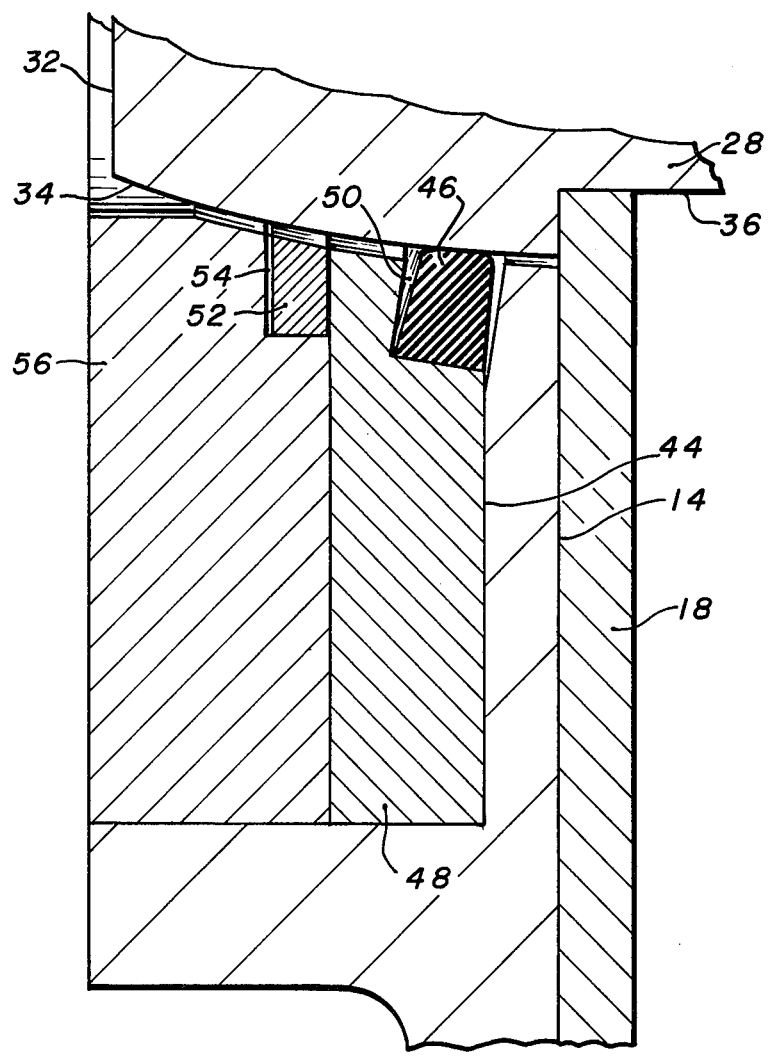
FIG. 3 is an enlarged cross-section view of a portion of the valve illustrated in FIG. 2.

Carried within the housing 10 is a shaft and butterfly assembly 26. The butterfly 28 conventionally is generally disc or cylindrically shaped and is provided with faces 30 and 32. The annular sealing surface 34 of the butterfly 28 is, in the preferred form, a section of a sphere extending radially outward from the face 32 to the periphery 36 of the butterfly 28 as best shown in FIG. 3. The butterfly 28 is fixedly mounted to the shaft 38, as seen in FIG. 2, which is rotatably mounted in the bushings 16 and 18. Attached to the free end of the shaft 38 is a handle or actuator 42 for rotating the shaft and the butterfly between the closed position shown to the open position at which the butterfly is a right angle to the illustrated position. Shaft seals would conventionally be provided around the shaft 38 but these have been omitted in the drawings for simplicity.

The housing 10 includes a generally planar annular retainer mounting surface 44. Positioned in abutting relationship to the annular sealing surface 34 of the butterfly 28 when the butterfly is in the closed position is a conventional annular seal 46. This seal 46 is formed from any of the common resilient materials used for such purposes such as rubber or plastic. One material which can be used, for example, is a fiber glass reinforced polytetrafluorethylene. It is this resilient seal 46 which can deteriorate or be destroyed when subjected to the high temperatures occasioned by a fire in the vicinity. The resilient seal 46 is retained in position by means of the annular retaining ring 48 which is grooved at 50 to accommodate the seal 46. This retaining ring 48 is retained against the annular retainer mounting surface 44 as will be explained hereinafter. It is important to note that this seal 46 may be any desired slope or contour as long as it is formed from a resilient material which is adversely affected by high temperatures.

Surrounding the annular sealing surface 34 and spaced from the resilient seal 46 is a heat resistant seal 52. The seal 52, which is preferably formed from metal, is non-resilient and hard. It could not effectively be used in place of the resilient seal 46 for normal service since it would cause galling of the sealing surface 34 of the butterfly 28. Therefore, it is normally maintained in an expanded condition in which it is spaced outwardly from the sealing surface 34 as shown and as will be explained hereinafter. This seal 52 is mounted in the groove 54 in the retaining ring 56. The retaining rings 48 and 56 are held in position by means of bolts 58 which are screwed into the mounting surface 44.

Figure 4:
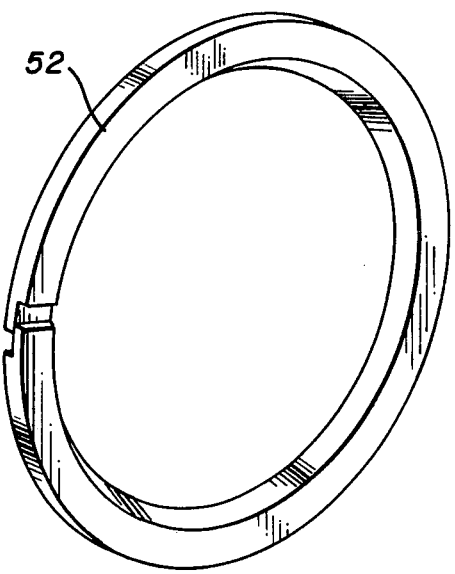
FIG. 4 is a perspective view of the seal of the present invention.
Figure 5:
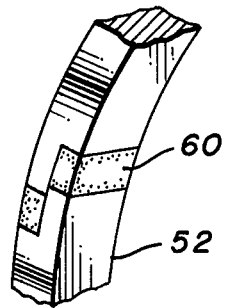
FIG. 5 is a perspective view of a portion of the seal of FIG. 4 illustrating the fusible joint.
Figure 6:
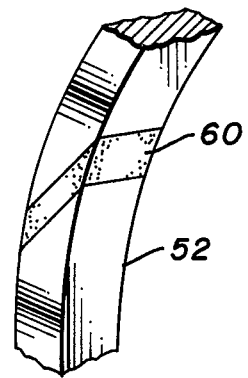
FIG. 6 is a perspective view similar to FIG. 5 illustrating a modified form of the fusible joint.

FIG. 4 illustrates in perspective a metallic, heat resistant sealing ring 52 which is very similar in construction and properties to a piston ring. It is a split ring which is springy and can be expanded circumferentially. In the present invention, the ring 52 is expanded to the appropriate diameter and held in this position by means of the fusible link or joint 60 as shown in FIGS. 5 and 6. The joint in the ring 52 shown in FIG. 5 is a lap joint while the joint shown in FIG. 6 is an angled joint. The lap or some other type of labyrinth joint is preferred since the joint itself will seal more effectively when the ring 52 is contracted into its sealing position against the butterfly.

After the metal sealing ring 52 is fused in the expanded position, it is placed in the groove 54 and the retaining ring 56 bolted to the valve housing. In this condition, the metal sealing ring 52 cannot contact and gall the sealing surface 34 of the butterfly 28. However, when the temperature rises sufficiently, the fusible link 60 will melt and the springy sealing ring 52 will contract and seal against the sealing surface 34.

The fusible link 60 may be formed from any desirable low temperature melting material such as solder. Of course, it may be either a metal or other low temperature melting material such as a suitable plastic material and may be formed from the same material as the primary seal so that they will melt at the same temperature. The sealing ring 52 can be formed from any suitable material as long as it is springy and will return to its contracted position and as long as it is heat resistant. Although metal is preferred, in certain instances plastics with high temperature resistance could be used. Obviously, both seals must be inert to the material flowing through the valve.

Figure 7:
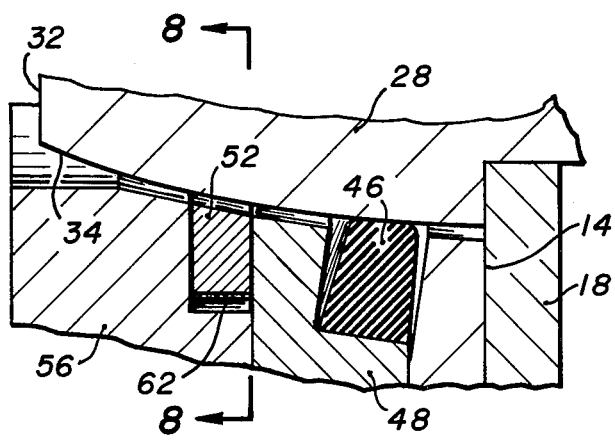
FIG. 7 is a cross-section view of a portion of the valve illustrating spring means associated with the seal.
Figure 8:
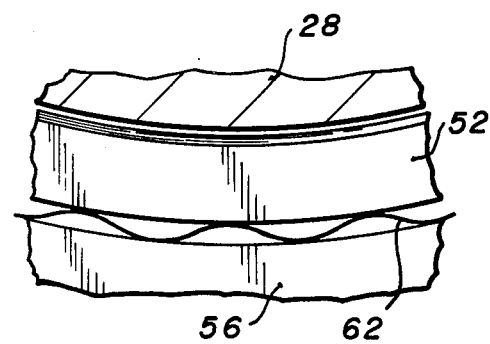
FIG. 8 is a view of a portion of the face of the seal illustrated in FIG. 7.

As indicated, the embodiment illustrated in FIGS. 2 and 3 and discussed thus far, depends upon the spring properties or internal stress of the metal sealing ring 52 to contract the ring around the sealing surface 34 when the fusible link 60 melts. FIGS. 7 and 8 illustrate a variation of the invention in which spring means is employed to ensure the contraction of the sealing ring 52 around the sealing surface. In this embodiment, a wave spring 62 is located in the groove 54 between the sealing ring 52 and the bottom of the groove. The wave spring 62 is in the compressed state when the sealing ring is installed so that the spring is applying a force radially inward on the sealing ring. Therefore, when the fusible link 60 melts, the spring will force the sealing ring 52 into the contracted, sealing position. Although a wave spring has been illustrated, other forms of springs or springy material could be used in place of the wave spring.

The valve of the present invention under normal operating conditions will seal with the conventional resilient seal 46. The non-resilient sealing ring 52, which is formed of a material which would not form as satisfactory a seal as the resilient seal 46, is held in an inoperative (non-sealing) position. When an excessively high temperature is reached which is at or near the temperature at which the resilient seal will deteriorate, the fusible link 60 will melt or otherwise be destroyed allowing the sealing ring 52 to contract around the sealing surface 34. Another feature of the invention is that the valve may still be operated after the emergency has passes with the secondary heat resistant sealing ring 52 serving the sealing function until the resilient seal can be replaced.

While several embodiments of the invention have been shown and described, it will be understood that these are illustrative rather than restrictive and that changes may be made without departing from the spirit and scope of the invention as claimed.

What is claimed is:

1. A valve comprising:
   a. a housing including a generally cylindrical flow passage therethrough;
   b. a generally disc shaped closure member including an annular peripheral sealing surface, said closure member mounted for rotation in said flow passage between a first position where said flow passage is open and a second position where said flow passage is closed;
   c. a first annular sealing member formed from a resilient material and mounted on said housing whereby said first annular sealing member sealingly contacts said peripheral sealing surface of said closure member when said closure member is in said second closed position;
   d. a second annular sealing member formed from non-resilient material, said second annular sealing member being mounted on said housing surrounding said peripheral sealing surface and being expandable in diameter whereby said second annular sealing member seals on said peripheral sealing surface when un-expanded and is spaced from said peripheral sealing surface when expanded; and
   e. means holding said second annular sealing member in said expanded condition, said holding means being adapted to permit said second annular sealing member to return to said un-expanded position when a preselected high temperature is reached whereby said second annular sealing member seals against said peripheral sealing surface.

2. A valve as recited in claim 1 wherein said second annular-sealing member is a split ring and said holding means is a low temperature melting material.

3. A valve as recited in claim 2 wherein said holding means is formed from the resilient material of said first annular sealing member.

4. A valve as recited in claim 2 wherein said second annular sealing member is formed of metal.

5. A valve as recited in claim 4 wherein said holding means comprises solder.

6. A valve as recited in claim 1 and further including spring means adapted to force said second annular sealing member from said expanded condition to said un-expanded condition.

7. A valve as recited in claim 6 wherein said spring means comprises a wave spring.

8. A valve comprising:
   a. a housing including a generally cylindrical flow passage therethrough;
   b. a generally disc shaped closure member including an annular peripheral sealing surface, said closure member mounted for rotation in said flow passage between a first position where said flow passage is open and a second position where said flow passage is closed;
   c. a first annular sealing member formed from resilient material and mounted on said housing whereby said first annular sealing member sealingly contacts said peripheral sealing surface of said closure member when said closure member is in said second closed position, and
   d. a second annular sealing member formed from non-resilient material, said second annular sealing member being in the form of a split ring which is expanded and held in said expanded condition by means of a low temperature melting material and being mounted on said housing such that said second annular sealing member surrounds said peripheral sealing surface of said closure member when said closure member is in said second closed position and is spaced therefrom when in said expanded condition and sealingly contacts said peripheral sealing surface when said low temperature melting material melts permitting said second annular sealing member to contract to an un-expanded condition.

9. A valve as recited in claim 8 and further including spring means adapted to force said second annular sealing member from said expanded condition to said un-expanded condition.

10. A valve as recited in claim 9 wherein said spring means comprises a wave spring.

* * * * *